United States Patent [19]

Applegate et al.

[11] Patent Number: 4,740,092
[45] Date of Patent: Apr. 26, 1988

[54] PRINTHEAD SHIFTING FOR WEAR DISTRIBUTION

[75] Inventors: Steven L. Applegate; John C. Bartlett; Brian W. Damon; David W. Holcomb; Cary P. Ravitz, all of Lexington, Ky.

[73] Assignee: International Business Machines Corporation, Armonk, N.Y.

[21] Appl. No.: 885,356

[22] Filed: Jul. 14, 1986

[51] Int. Cl.⁴ .................................................. B41J 3/12
[52] U.S. Cl. ...................................... 400/53; 400/120; 400/121
[58] Field of Search .................... 400/17, 22, 53–55, 400/121, 120

[56] References Cited

U.S. PATENT DOCUMENTS

| 4,033,444 | 7/1977 | Beery | 197/1 R |
| 4,167,342 | 9/1979 | Mower et al. | 400/124 |
| 4,247,207 | 1/1981 | Klimek et al. | 400/121 |
| 4,467,363 | 8/1984 | Tench, Jr. | 358/261 |
| 4,521,123 | 6/1985 | Boehmer | 400/124 |
| 4,575,731 | 3/1986 | Horlander | 346/76 PH |
| 4,625,216 | 11/1986 | Brooks et al. | 346/76 PH |

FOREIGN PATENT DOCUMENTS

| 156783 | 9/1984 | Japan | 400/17 |
| 129266 | 7/1985 | Japan | 400/17 |

OTHER PUBLICATIONS

*IBM Technical Disclosure Bulletin* article entitled "Improving Life of Electrode Printhead" vol 27, No. 10B Mar. 1985 at pp. 5920–5921.

*Primary Examiner*—Paul T. Sewell
*Attorney, Agent, or Firm*—John A. Brady

[57] ABSTRACT

Wear on the elements (5) of a printhead (3) is spread by shifting the region of use of the printhead line by line. Font (13) provides information as to whether any character in a line employs the upper three pels or the bottom three pels of a line. For each line which can be printed from different shift positions of the printhead, selection logic controls paper feed (15) to index platen (9) to the least used of a shifted position of printhead. Only those electrodes over the print line in each shifted position are used for printing. This distributes wear without requiring any special ribbon feed. The three pel height is at least as wide as the serifs on most characters, which avoids some electrodes being used for the serifs of given characters in more than one shift position.

63 Claims, 5 Drawing Sheets

PRINTHEAD SHIFTING FOR WEAR DISTRIBUTION

DESCRIPTION

1. Technical Field

This invention relates to printing with a set of print elements which experience wear in relation to the extent of use of each print element. Specifically, the print elements typically operate on one side of a ribbon to transfer ink or marking material to paper or the like in contact with the other side of the ribbon. Such print elements typically are arranged in at least one column, with each element individually selectable to cause formation of individual dots which, together with other dots from the elements, form a character image. The specific embodiment discussed is a thermal printer with 40 electrodes in a column on a printhead. The 40 elements cover substantially one line during normal paper feed, so that ideally a dot from the bottom element would just touch a dot from the top element of the next line. Alternatively, however, the print elements may be wires or other dot-forming impact elements.

2. Background Art

U.S. Pat. No. 4,033,444 to Beery and *IBM Technical Disclosure Bulletin* article entitled "Improving Life Of Electrode Printhead," Vol. 27, No. 10B, March 1985 at pp 5920–5921 disclose distributing wear on a column of print elements by changing the set of elements used. The patent discloses two impact elements more than needed to print with only one set of impact elements. The article discloses a resistive ribbon system of the kind which is the preferred embodiment of this invention having a printhead of sixty electrodes with printing done in different sets of forty to distribute wear. In both the patent and the article, shifting is not related to a determination of the content of the line to be printed.

U.S. Pat. No. 4,167,342 to Mower et describes a plurality of separated groups of print elements and the selection between the groups to even wear.

U.S. Pat. No. 4,247,207 to Klimek et al is to printing characters in a matrix of seven dots high using a print element nine dots high. The seven elements selected are specified by a bit in the code defining the character to be printed, depending upon the form of the character. Thus, where a descender is to be prominent, the lower seven elements are used.

U.S. Pat. No. 4,521,123 to Boehmer is to displacing a printhead vertically so as to sequentially print higher and lower parts of a character.

This invention employs observing a line to be printed before it is printed and shifting in accordance with the conditions observed by such look-ahead. Look-ahead is broadly conventional in printers, but no such function is known which is used to shift a column of print elements.

The preferred embodiment of this invention is in a resistive ribbon printing system having forty electrodes in a column. Such systems are known and are described in various respects in a number of patents assigned to the assignee of this invention. The following two patents are illustrative of such printing systems with respect to this invention: U.S. Pat. Nos. 4,467,363 to Tench and 4,575,731 to Horlander.

DISCLOSURE OF INVENTION

Detrimental effects of wear on the elements of a printhead are reduced by shifting the region of use of the printhead line by line. The printhead of the preferred embodiment is for resistive ribbon printing and has forty electrodes in a column. Information defining the shape of characters printed is stored in memory in association with information specifying whether the character employs the bottom and top regions of the forty electrodes. A data processor or other electronic logic examines a line to be printed prior to the printing of the line, and the paper being printed upon is positioned at the top, middle, or bottom of a line so as to print in a less-used region of the electrodes.

Use of the least-used region of electrodes is preferred, and even distribution among the regions used is approximated when the data does not permit complete balance. Lines which will be printed in part, but may be added to (because of, for example, buffer-full or timeout) are printed in the middle region.

This invention permits the use of printheads having the same number of electrodes as is used without regard to this invention. Yet, wear is distributed more effectively than had electrodes been added. If electrodes were added, the ribbon would either be made wider or shifting between the printhead and the ribbon would be required. Widening the ribbon necessitates larger and heavier ribbon-related structures and use of increased ribbon area for a given amount of printing. The alternative of moving the ribbon to the region of the printhead shifted to for printing requires special mechanisms for this purpose, which necessitate added expense and the potential of unreliability.

BRIEF DESCRIPTION OF DRAWINGS

The details of this invention will be described in connection with the accompanying drawing, in which.

BEST MODE FOR CARRYING OUT THE INVENTION

Figure 1:
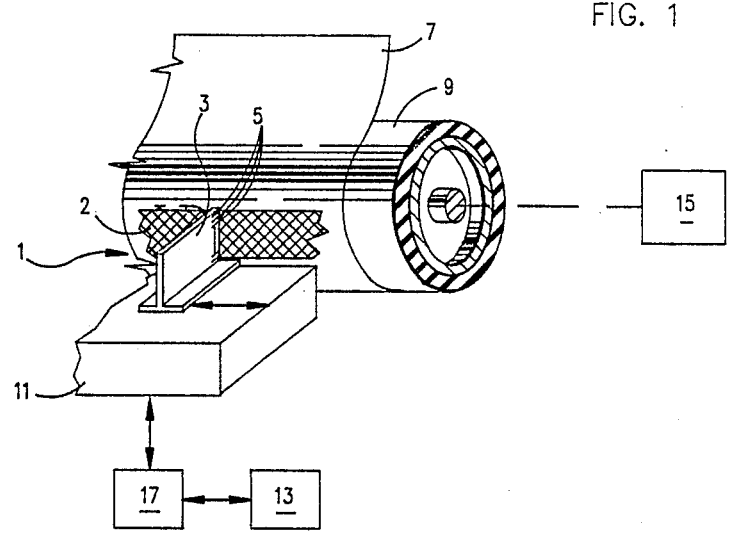
FIG. 1 is illustrative of a printing system employing this invention.

FIG. 1 is illustrative of a printing system employing this invention. The preferred system is a resistive ribbon printer 1 in which a ribbon 2 has a resistive outer layer against which a printhead 3 presses during printing. Printhead 3 supports 40 electrodes 5 in a column which covers vertically a line of printing on paper 7 held on platen 9 between printhead 3 and platen 9. The outer surface of ribbon 2 opposite printhead 3 carries a thermal ink which becomes flowable in response to heat created in ribbon 2 by electrical current driven into ribbon 2 by electrodes 5 of printhead 3. Printhead 3 is mounted on carrier 11 and moved across paper 7 parallel to platen 9, as suggested by the arrows on carrier 11. Electrodes 5 are driven or not driven with respect to the position of printhead 3 on paper 7 so as to define selected graphic images or characters. This printing system as just described is known and is described in a number of patents assigned to the assignee of this invention, for example, as the printing system of the foregoing U.S. Pat. No. 4,467,363 to Tench and No. 4,575,731 to Horlander.

To practice this invention this printing system has a font memory 13, which preferably contains data as described in the foregoing U.S. Pat. No. 4,467,363 to Tench, but which additionally contains for each stored character a separate, two bit code specifying whether the specific character employs the top three electrodes in a column of forty electrodes, or the bottom three electrodes, or both the top three and the bottom three of the forty electrodes 5. The paper feed system 15 has the capability of feeding paper in increments of the spacing of three electrodes, which is 1/80 inch (approximately 0.03 cm) in the typical system where forty electrodes cover one line, which is 1/6 inch (approximately 0.42 cm). Such paper feed may be entirely conventional, as by a direct drive from a conventional stepper motor. The system is controlled by a central data processor 17, typically a microprocessor, but which may be special-purpose logic.

Figure 2:
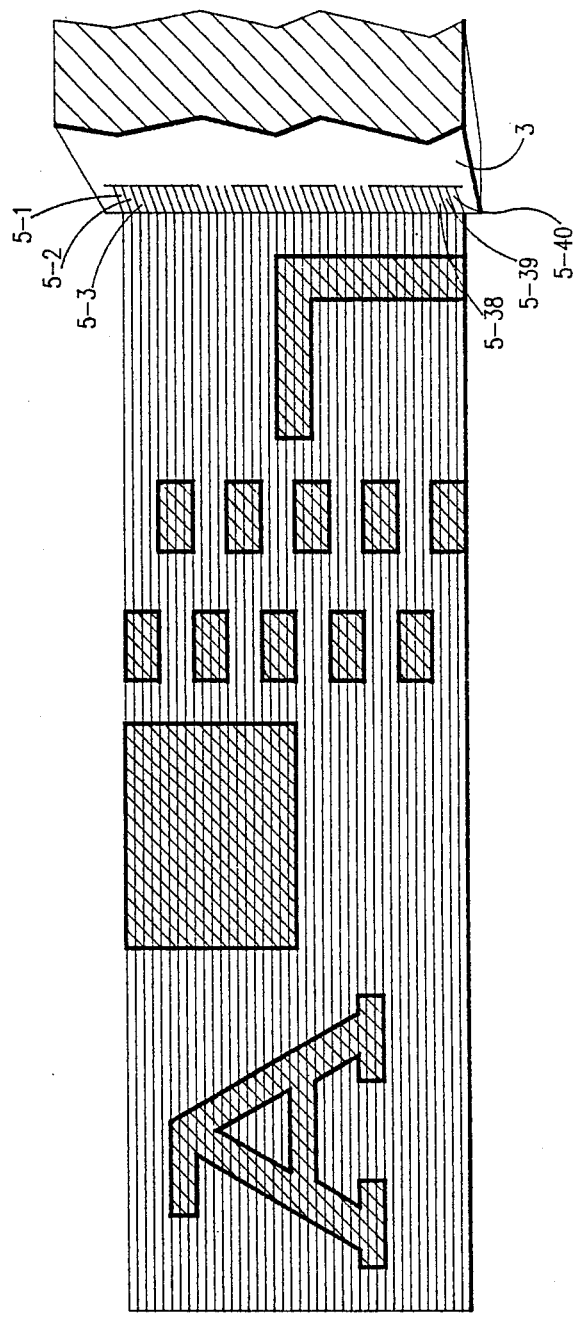
FIG. 2 is illustrative of a printhead printing a line of characters and particularly illustrates variations in characters significant to this invention.

Reference is made to FIG. 2 to illustrate in some detail the forms of characters to be printed as they are positioned on a line of printing. Printing is made on a line as carrier 11 moves horizontally across paper 7 on platen 9, as is conventional. The print on FIG. 2 is shown in relation to the electrodes 5 and to horizontal lines across which the electrodes 5 sweep so that the inked areas made by each electrode is apparent. Electrodes 5 are denominated 5-1 through 5-40, with 5-1 being the top electrode, 5-2 being the next lower electrode, and the other electrodes being in sequence.

The first character of the line shown in FIG. 2 is a capital A. This is generally centered in the print line and does not use electrodes 5-1, 5-2, 5-3, 5-38, 5-39, and 5-40 when printhead 3 is in the centered position as shown in FIG. 2. The next character is an upper one-half box, a common symbol used in certain graphics applications that extends to the very top of the line and therefore employs electrodes 5-1, 5-2, and 5-3 when printhead 3 is in the centered position, but does not employ electrodes 5-38, 5-39 and 5-40 when printhead 3 is in the centered position. The next character is a shading symbol of alternating black rectangles in a white background, which is also a known symbol used in graphics and which extends to the very top and bottom of the line. The shading symbol therefore employs both electrodes 5-1, 5-2, and 5-3 and electrodes 5-38, 5-39, and 5-40 when printhead 3 is in the centered position. The final character shown for illustration in FIG. 2 is an upper box corner, another common graphics symbol. This employs electrodes 5-38, 5-39, and 5-40 when the printhead 3 is in the centered position, but does not employ electrodes 5-1, 5-2, and 5-3 when printhead 3 is in the centered position. Other characters frequently using the region of the three top electrodes are the slash and accent marks of many European languages. The underline employs at least one of the bottom three electrodes.

To more readily understand this invention, it is helpful to think of the dots by which characters are formed separate from the electrodes 5 which form the dots. These dots are typically called picture elements or pels. With reference to FIG. 2, the pels for each column may also be considered to be numbered from top to bottom. Each column in a line contains 40 pels, each of which will be printed dark or be left light because not printed. In FIG. 2 the electrodes 5 coincide with the pels since one electrode 5 is positioned above each pel.

Figure 3:
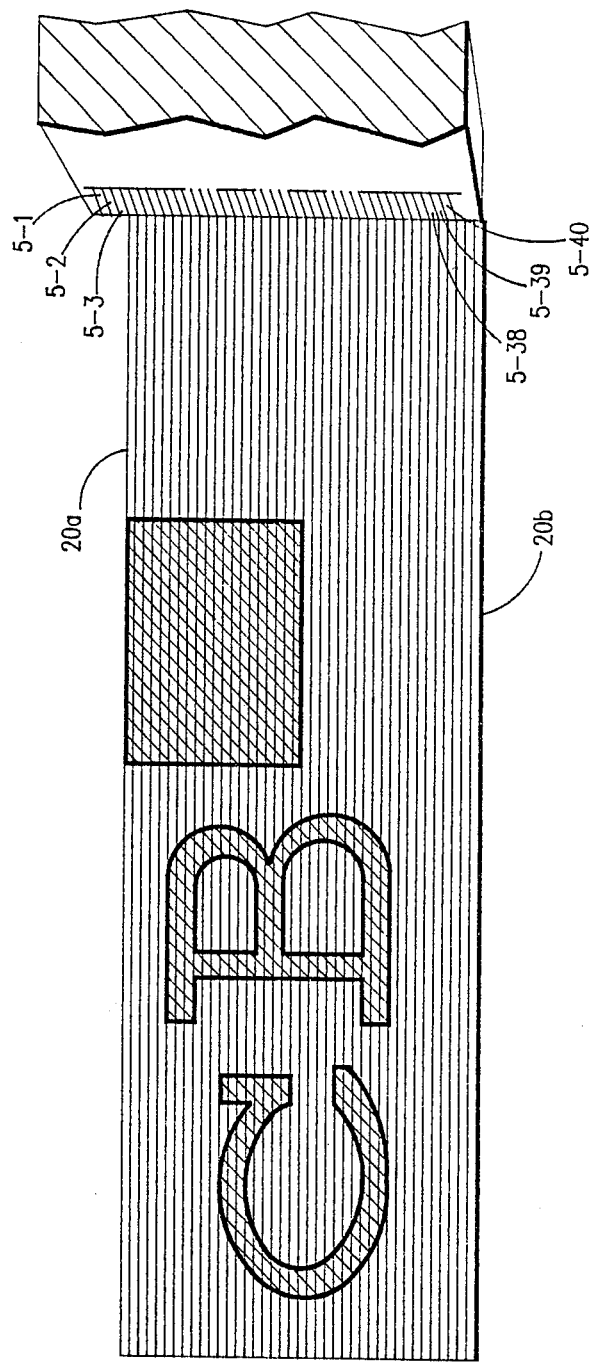
FIG. 3 is illustrative of the printing of a line with the printhead shifted to the position in which the electrodes are moved to employ the bottom electrodes.

FIG. 3 illustrates a printed line with printhead 3 in the shifted-to-bottom-electrodes position where it has printed the line shown. Top line 20a indicates the top margin of the line being printed and bottom line 20b indicates the bottom margin of the line being printed. Shown in the line are characters lower case c and capital B in that order, followed by an upper one-half box. Electrodes 5 are positioned so that electrode 5-40 is located the height of three electrodes 5 above margin 20b, the bottom of the printed line. (Stated differently, electrodes 5-4 through 5-40 are positioned over pels 1 through 37.) This is possible because none of the characters in the line are formed by printing in the lower region. Similarly, electrodes 5-1, 5-2, and 5-3 are above top margin 20a and therefore overlap the next higher line. Actual printing in that higher line does not occur since electrode 5-4 is driven when the data to be printed calls for the highest electrode in the current line to be driven and the lower electrodes 5 are similarly driven with data which relates the lower electrodes 5 to electrode 5-4 being the highest electrode. For example, this bottom position electrode 5-40 receives data which would be received by electrode 5-37 when the electrodes are in the center position. (Stated differently, electrodes 5-4 through 5-40 receive data for pels 1 through 37 respectively, while electrodes 5-1 through 5-3 are not driven.)

Figure 4:
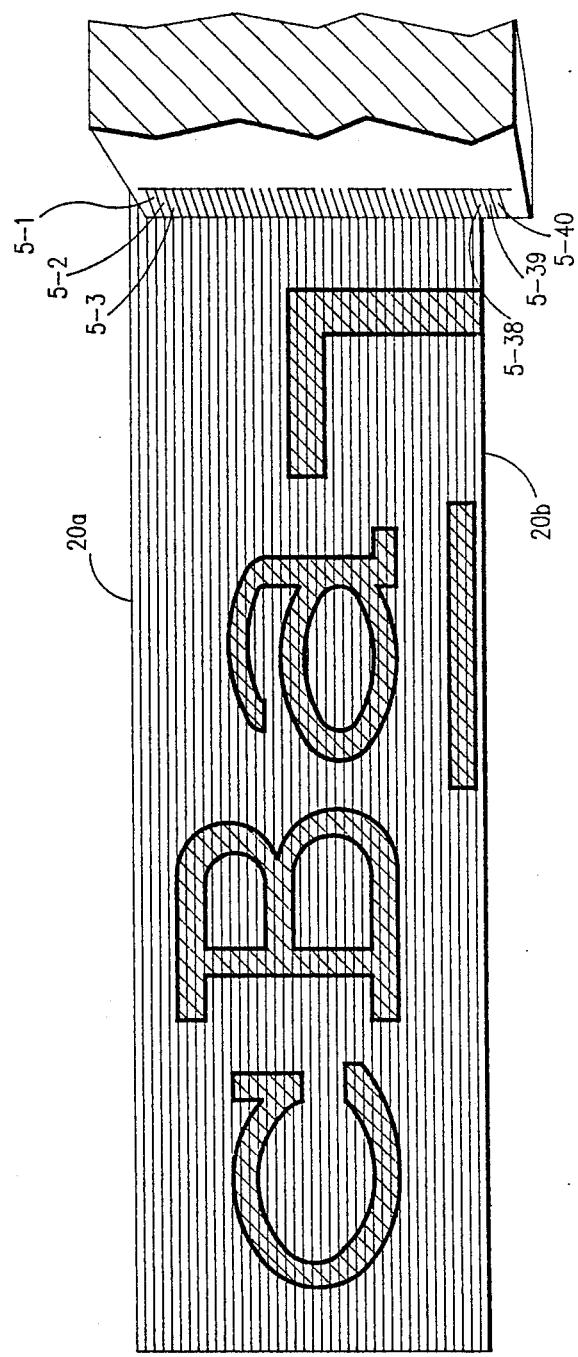
FIG. 4 is illustrative of the printing of another line with the printhead shifted to the position in which the electrodes are moved to employ the top electrodes.

FIG. 4 illustrates a printed line with printhead 3 in the shifted-to-top-electrodes position where it has printed the line shown. As in FIG. 3, top line 20a indicates the top margin of the line being printed and bottom line 20b indicates the bottom margin of the line being printed. Shown in the line are characters lower case c and capital B in that order, as well as lower case a underlined and a upper box corner. Electrodes 5 are positioned so that electrode 5-1 is the height of three electrodes 5 below line 20a, the top of the printed line. This is possible because none of the characters in the line are formed by printing in the upper region. Similarly, electrodes 5-38, 5-39, and 5-40 are below line 20b and therefore overlap the the next lower line. Actual printing in that lower line does not occur since electrode 5-1 is driven when the data to be printed calls for the fourth highest electrode in a line to be driven and the lower electrodes 5 are similarly driven with data which relates the lower electrodes 5 to electrode 5-1 being the fourth highest electrode. Since the data is for forty electrodes, electrodes 5-38, 5-39, and 5-40 will not receive any data and therefore will not be driven when printhead 3 is in the shifted-to-top-electrodes position. (Stated differently, electodes 5-1 through 5-37 receive data for pels 4 through 40 respectively, while electrodes 5-38 through 5-40 are not driven.)

It will be understood, of course, that, while only a few characters in the lines discussed in FIG. 3 and FIG. 4 are specifically mentioned, printing with the printhead shifted in this embodiment requires that all of the characters printed in a shifted line must be of a form requiring no printing in the region not covered by print elements 5. Thus, with respect to FIG. 3, the underline or a upper box corner, for example, are not in the line printed, since they would require electrodes for printing in the region occupied by the bottom three electrodes 5 when printhead 3 is centered. Similarly, with respect to FIG. 4, the lower box corner or the shading symbol (FIG. 2), for example, are not in the line printed, since they would require electrodes for printing in the region occupied by the top three electrodes 5 when printhead 3 is centered.

Figure 5:
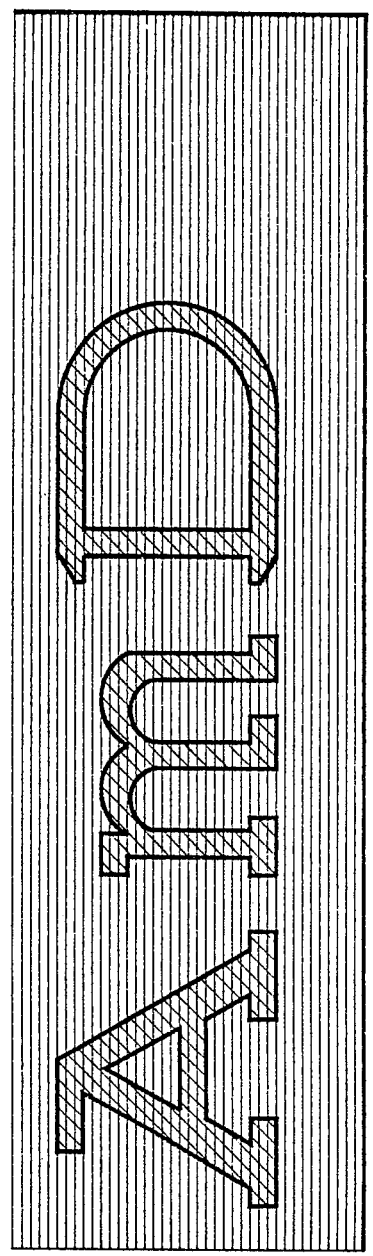
FIG. 5 illustrates typical characters having serifs in relation to the size of individual print elements.

FIG. 5 shows characters in styles having ornamented line endings and flourishes commonly called serifs. Typical type styles include areas, particularly at the bottom of letters and top of lower case letters, which are more heavily used. Additionally, serifs occur frequently enough to be a major source of differential wear of the printhead. The horizontal lines in FIG. 5 form stripes showing the areas printed by individual electrodes in this preferred embodiment. The capital A shown in FIG. 5 has a serif formed by a top, horizontal line extending from the very top of the letter to the left. The lower case m shown has bottom horizontal lines extending away from the body of the letter. The capital D shown has tapered left endings. Such serifs typically are the among the smallest lines printed in any character set, and they typically require driving at least two contiguous electrodes 5 (equivalent to 1/120 inch or approximately 0.021 cm) and often three adjacent electrodes 5. By shifting the height of three electrodes 5 instead of some lesser amount, printing of serifs is generally shifted to completely different electrodes and wear is therefore better distributed.

Figure 6:
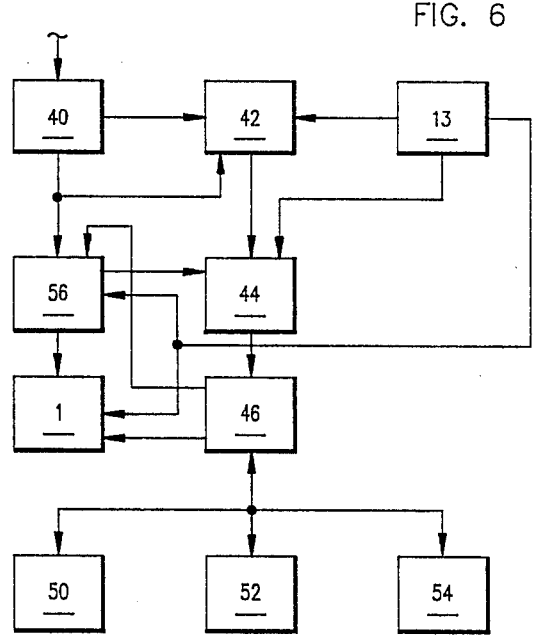
FIG. 6 illustrates a control system for the invention.

A control system for specific implementation is illustrated in FIG. 6. Thus, data defining characters to be printed is received in receive buffer 40, where it is observed by line-end logic 42, which compares the length of text received with a designated line length. Line-end logic 42 also recognizes a mandatory line ending code in the data as terminating a line. The character data is extracted from font memory 13, which, in addition to the standard function of defining the form of each character, also transmits to region-use logic 44 information as to whether each character employs the top-three-electrode region and the bottom-three electrode region of the centered printhead 3. Line end logic 42 signals region-use logic 44 at a line ending, and region-use logic 44 then determines the available shift positions of printhead 3.

Selection of the printhead 3 shift position used is made by selection logic 46 based upon available position information from logic 44 and prior use of shift positions, with centered being the position selected if another position is not possible by the known information from the data. As discussed in the foregoing in detail, the three available shift positions are center, top (shift to top electrodes), and bottom (shift to bottom electrodes). The use of each position is monitored in counter 50, which, is incremented to count each use of center; counter 52, which is incremented to count each use of bottom; and counter 54, which is incremented to count each use of top. Counters 50, 52, and 54 preferably of standard binary devices which employ eight bit positions and therefore have a full capacity of counting from zero to 255. Selection logic 46 selects the shift position based on the new shift position being one permitted by region-use logic 44 and being the least used of those permitted shift positions as shown by the lowest count in counters 50, 52, and 54. For example, region-use logic 44 may show that a line can be printed with printhead 3 in center or bottom. If counter 50 has a lower count than counter 52, selection logic 46 will select center and signal the printer (FIG. 1) accordingly.

The maximum count of each counter 50, 52, and 54 is 255, and the counters 50, 52, and 54 are initiated at the same value, specifically 16. When any counter 50, 52, and 54 reaches 255, the value in the counter 50, 52, and 54 having the smallest value is subtracted from all of the counters 50, 52, and 54. Any resulting count below the initial value is reset to the initial value. (Two counts below the initial value are reset to the initial value in a counter which has the lower count and to the initial value plus one in a counter having a higher count.) This retains generally the differential between the numbers in the counters to assure close approximation to even distribution of wear, while subtracting no more than the initial value assures that the counters 50, 52, and 54 are not presented with a negative result and therefore operated beyond their physical range.

The initial line after turning on the machine is at center. Therefore, when the counts are even, shifting is by a set pattern of first to top if top available, then to bottom if top is not available, and then to center if top and bottom are not available.

Data to be printed is assembled in print buffer 56 in the sequence at which it is to be printed by the printer (FIG. 1). Line-end logic 42 also responds to buffer 56 being full or to a predetermined, long time period occurring, after which any content of buffer 56 will be printed (a standard time-out function). In these two conditions, further information to be printed in the line may follow, but is not available at the time of printing. These conditions are recognized by selection logic 46 to define printing as centered.

At any condition at which a line of printing from buffer 56 is to occur, initial data in buffer 56 is revised to define the shift position specified by selection logic 46. Characters are normally stored in buffer 56 as abbreviated, unique codes defining the character. As printing occurs, the exact pel information defining the character form is produced by interrogating the font memory 13 and expanding that data by predetermined expansion formulas to define the exact character form with a logical one or logical zero representing each pel.

In some specialized modes of operation, buffer 56 is loaded with that exact pel information. These modes typically involve either modification of data of the font 13 or a bypassing of data in font 13. For example, for a superscript or subscript the font data may be used in a modified, compressed form to define the superscript or subscript. The character including the superscript in pel form is determined from the font using font information, and stored in buffer 56 in pel form. Similarly, the system may receive character information as an external input. Characters in pel form defined by such information are stored in pel form in buffer 56. In these specialized modes, buffer 56 is examined by region-use logic 44 for the existence of logical bits which define pels driven in the top three pels and the bottom three pels of a column. This information is equivalent to the font information of region-use in the font 13. The result of this information defines the available region in a line to be printed, which is transmitted to selection logic 46. Extracting the region-use information from data directly corresponding to the pels involved requires considerable data processing repetition and therefore may slow printing. When the region-use data is delivered by the font 13 in a single bit of code, as is the primary mode in this embodiment, determining the shift position rarely introduces noticeable delay in printer operation.

Immediately prior to the printing of each line, paper feed 15 is activated to index platen 9 the distance of a full line height less the height of three electrodes 5 (to the bottom shift position), and carrier 11 is returned.

(The full line high less three is 37 when the starting position is center, 40 when the starting position is bottom, and 34 when the starting position is top.) In response to selection logic 46, platen 9 is signalled to index an additional distance equal to the height of three electrodes 5 upward for additional paper feed if the shift position is to center and is signalled to index the height of six electrodes 5 if the shift position is top. Usually the overall system is fast enough that paper feed 15 operates continuously to move platen 9 is to actual printing position specified. In any event moving platen 9 backward is never required, which simplifies the functional requirements of paper feed 15.

The foregoing system is implemented primarily with a microprocessor, as the logic steps involved will be recognized as well within the conventional and routine capabilities of existing microprocessors. Such a system implemented primarily by combinational logic, as was more common prior to the microprocessor becoming widely available and inexpensive, would improve the logic speed, but logic speed is rarely a limiting factor in conventional printing systems, while combinational logic would entail greater expense and less flexibility in adding to and changing the system. Unless the number of systems to be made is exceptionally large, employing primarily combinational logic would be much more expensive than use of a programmed microprocessor for the task.

The center position is the normal one for printing as it is the position of a prior art printer of the kind of this preferred embodiment. Such a prior art printer employed the 40 electrodes with printing in one position corresponding to the center position of this invention. Ribbon 2 is wide enough to be in contact with the 40 electrodes simultaneously, so that printing from any combination of the 40 electrodes may be done simultaneously. This invention requires no change of the positioning of ribbon 2 with respect to the 40 electrodes on printhead 3 since the shifting is with respect to the printhead and platen 9. No special mechanism is needed to shift ribbon 2 with respect to printhead 3 since no such shifting occurs in this embodiment. That avoids the need for a mechanism which would be both expensive and prone to error, since ribbon 3 would have to be both fed longitudinally and laterally.

Wear at each electrode 5 is a function of actual use of the electrode 5. In this printing system current is driven from an electrode 5 selected by the pel pattern being printed. That current causes some electrical discharge and possible ionization at the tip of the electrode, which is in contact with a resistive layer of ribbon 1. Also, temperature is raised at the electrode 5 during the driving of current. Although the exact mechanism of wear is not established, increased wear as a function of actual frequency of current being driven during printing is experienced. Accordingly, by distributing that wear to other electrodes 5 which would otherwise be less frequently used, the entire set of electrodes 5 may be used for a greater amount of printing prior to one or more of the electrodes 5 being so deteriorated by wear that the printing is unsatisfactory. A typical increase of use for a system such as the preferred embodiment described is about 50 percent. It is apparent, of course, that in other systems, such as mechanical systems, wear is also a function of use and that this invention is similarly applicable to such systems.

Also, other enhancements may be readily employed with this invention. Specifically, electrodes 5 preferably are each slightly wider than they would be to ideally just cover the height of one line, so that slightly excessive line indexing caused by normal operating variations will not result in a gap between print from the bottom electrode 5 of the higher line and the top electrode 5 of the next line below.

Various alternatives and variations will be apparent. For example, the determination of use of the top and bottom regions may be by use of a separate memory storing line area used by each character rather than by storing that information directly with the form-of-character information. Where the system described is detrimental, such as when paper feed raises special problems when printing is near the very bottom of a page, the system is deactivated at such locations or modified to use only center and bottom positions at such locations by program control. Accordingly, patent coverage should be in accordance with the true scope and spirit of this invention, with particular reference to the following claims, as provided by law.

We claim:

1. A printing system comprising a printer having print elements in a column, means to examine data for lines to be printed by said printer prior to printing, means to determine from said examinded data continuous sections of said column of said print elements which can print all of the data in each of said lines and means responding to said means to determine to position said column of print elements in different positions along said column at which data can be printed by said sections, said different positions being selected based on the prior use of said print elements to distribute use of said print elements.

2. A printing system as in claim 1 in which said means to determine comprises an electronic memory storing both the form of characters represented by said data and the region of a print line occupied by the printing of caharacters stored in said memory, and said means to determine responds to said region information to determine whether a top region of a line to be printed and a bottom region of a line to be printed receive printing.

3. The printing system as in claim 2 also comprising a buffer memory to receive data for printing and means to observe the transmission of data to said buffer memory and the time period in which data to said bufer memory is delivered to provide a control signal when information in said buffer memory will be printed without a defined end-of-line status, said means to determine responding to said control signal to cause positioning of said column of print elements in a center region of said column of said print elements.

4. The printing system as in claim 1 also comprising a buffer memory to receive data for printing and means to observe the transmission of data to said buffer memory and the time period in which data to said buffer memory is delivered to provide a control signal when information in said buffer memory will be printed without a defined end-of-line status, said means to determine responding to said control signal to cause positioning of said column of print elements in a center region of said column of said print elements.

5. The printing system as in claim 4 in which printing is conducted in a top section of said column, in a bottom section of said column, and with said column centered, and also comprising means to count each use of said top, said bottom, and said centered, and in which said means to determine determines the next of said top, bottom and centered sections to be that represented by the lowest count of said means to count.

6. The printing system as in claim 1 in which printing is conducted in a top section of said column, in a bottom section of said column, and with said column centered, and also comprising means to count each use of said top, said bottom, and said centered, and in which said means to determine determines the next of said top, bottom and centered sections to be that represented by the lowest count of said means to count.

7. The printing system as in claim 2 in which printing is conducted in a top section of said column, in a bottom section of said column, and with said column centered, and also comprising means to count each use of said top, said bottom, and said centered, and in which said means to determine determines the next of said top, bottom and centered sections to be that represented by the lowest count of said means to count.

8. The printing system as in claim 3 in which printing is conducted in a top section of said column, in a bottom section of said column, and with said column centered, and also comprising means to count each use of said top, said bottom, and said centered, and in which said means to determine determines the next of said top, bottom and centered sections to be that represented by the lowest count of said means to count.

9. The printing system as in claim 8 in which said means to count comprises separate counters for said top, said bottom and said centered which are initially all set to a first predetermined value and in which said counters are all decreased by the lowest value of said counters when any one of said counters reaches a second predetermined value.

10. The printing system as in claim 5 in which said means to count comprises separate counters for said top, said bottom and said centered which are initially all set to a first predetermined value and in which said counters are all decreased by the lowest value of said counters when any one of said counters reaches a second predetermined value.

11. The printing system as in claim 6 in which said means to count comprises separate counters for said top, said bottom and said centered which are initially all set to a first predetermined value and in which said counters are all decreased by the lowest value of said counters when any one of said counters reaches a second predetermined value.

12. The printing system as in claim 7 in which said means to count comprises separate counters for said top, said bottom and said centered which are initially all set to a first predetermined value and in which said counters are all decreased by the lowest value of said counters when any one of said counters reaches a second predetermined value.

13. A printing system comprising a printer having at least fifteen individual print elements in a column mounted to be moved across a print-receiving paper mounted in said printer to print a line of characters on said paper, a buffer memory to receive said character information for printing by said printer and to store said character information prior to printing, line-end determination means responsive to characters received by said buffer memory and to predetermined non-character signals received with said character information to create a first control signal when said buffer memory has received characters to be printed as a full line, region-use determination means responsive to said first control signal and to characters in said full lines to create at least a second control signal when said characters in a full line do not include printing in a boundary region of said column, line-feed control means responsive to said second control signal to line feed said printer to a position at which a line to be printed has said print elements positioned to print on said line except on said boundary region, and means to print each full line employing those of said print elements positioned over said line and not employing those print element opposite said boundary region and not over said line.

14. A printing system as in claim 13 in which said region-use determination means comprises an electronic memory storing both the form of oharaoters represented by said data and the region of a print line occupied by the print of characters.

15. A printing system as in claim 14 in which said region-use determination means determines whether a top region of a line to be printed and a bottom region of a line to be printed receive printing in said full lines.

16. A printing system as in claim 13 in which said region-use determination means determines whether a top region of a line to be printed and a bottom region of a line to be printed receive printing in said full lines.

17. A printing system as in claim 16 in which said column of print elements is in the order of magnitude of forty which cover a line height of about 1/6th inch and in which said region is at least the height of two of said print elements.

18. A printing system as in claim 13 in which said column of print elements is in the order of magnitude of forty which cover a line height of about 1/6th inch and in which said region is at least the height of two of said print elements.

19. A printing system as in claim 14 in which said column of print elements is in the order of magnitude of forty which cover a line height of about 1/6th inch and in which said region is at least the height of two of said print elements.

20. A printing system as in claim 15 in which said column of print elements is in the order of magnitude of forty which cover a line height of about 1/6th inch and in which said region is at least the height of two of said print elements.

21. The printing system as in claim 20 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

22. The printing system as in claim 13 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

23. The printing system as in claim 14 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

24. The printing system as in claim 15 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

25. The printing system as in claim 16 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

26. The printing system as in claim 17 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

27. The printing system as in claim 18 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

28. The printing system as in claim 19 also comprising means to observe signals transmitted to said memory and the time period to deliver said character information to provide a third control signal when information in said buffer memory will be printed without a defined end-of-line status, said line-feed control means being responsive to said third control signal to line feed said printer to a position at which a line to be printed is centered with respect to said print elements.

29. The printing system as in claim 28 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

30. The printing system as in claim 13 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

31. The printing system as in claim 14 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

32. The printing system as in claim 15 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

33. The printing system as in claim 16 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

34. The printing system as in claim 17 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

35. The printing system as in claim 18 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

36. The printing system as in claim 19 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

37. The printing system as in claim 20 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

38. The printing system as in claim 21 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

39. The printing system as in claim 22 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

40. The printing system as in claim 23 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

41. The printing system as in claim 24 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

42. The printing system as in claim 25 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

43. The printing system as in claim 26 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

44. The printing system as in claim 27 in which said region-use determination means creates a first selection condition when characters in a full line do not include print in the top boundary region of said line, a second selection condition when characters in a full line do not include print in the bottom boundary region of said line, and a third selection condition when characters in a full line include print in both the bottom boundary region and the top boundary region of said line, and said line-feed control means responding to said first selection condition to line feed said printer to a position at which a line to be printed has said print elements positioned to print on said line except on said top boundary region, said line-feed control means responding to said second selection condition to line feed said printer to a position at which a line to be printed has said print elements positioned to print on said line except on said bottom boundary region, said line-feed control means responding to said third selection condition to line feed said printer to a position at which a line to be printed has said print elements centered on said line to be printed, and in which said printing system also comprises means to count each use of said selection conditions and means to determine the next of said selection conditions responded to to be that represented by the lowest count of said means to count.

45. The printing system as in claim 44 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

46. The printing system as in claim 29 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

47. The printing system as in claim 30 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

48. The printing system as in claim 31 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

49. The printing system as in claim 32 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

50. The printing system as in claim 33 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

51. The printing system as in claim 34 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

52. The printing system as in claim 35 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

53. The printing system as in claim 36 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

54. The printing system as in claim 37 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

55. The printing system as in claim 38 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

56. The printing system as in claim 39 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

57. The printing system as in claim 40 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

58. The printing system as in claim 41 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

59. The printing system as in claim 42 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

60. The printing system as in claim 43 in which said means to count comprises separate counters for said response to said first selection condition, for said response to said second selection condition, and for said response to said third selection condition, which counters are initially all set to a first predetermined value and in which said counters are all decreased by the lowest value of said counters when any one of said counters reaches a second predetermined value.

61. The printing system as in claim 60 in which said printer is a resistive ribbon printer and said print elements are electrodes for delivering current to a resistive ribbon.

62. The printing system as in claim 13 in which said printer is a resistive ribbon printer and said print elements are electrodes for delivering current to a resistive ribbon.

63. A printing system comprising a printer having print elements for printing in a column, means to examine data defining consecutive characters to be printed by said printer, means to determine from said examined data common regions in said consecutive characters to be printed wherein printing from said print elements normally corresponding to said regions is not required, and means responsive to said determination to position said print elements in different locations including locations for printing said data with said print elements normally corresponding to said regions, said different locations being selected based on the prior use of said print elements to distribute use of said print elements.

* * * * *